April 28, 1942.  E. T. ROSS  2,281,384
VARIABLE SPEED DRIVING MEANS
Filed Feb. 21, 1939   3 Sheets-Sheet 1
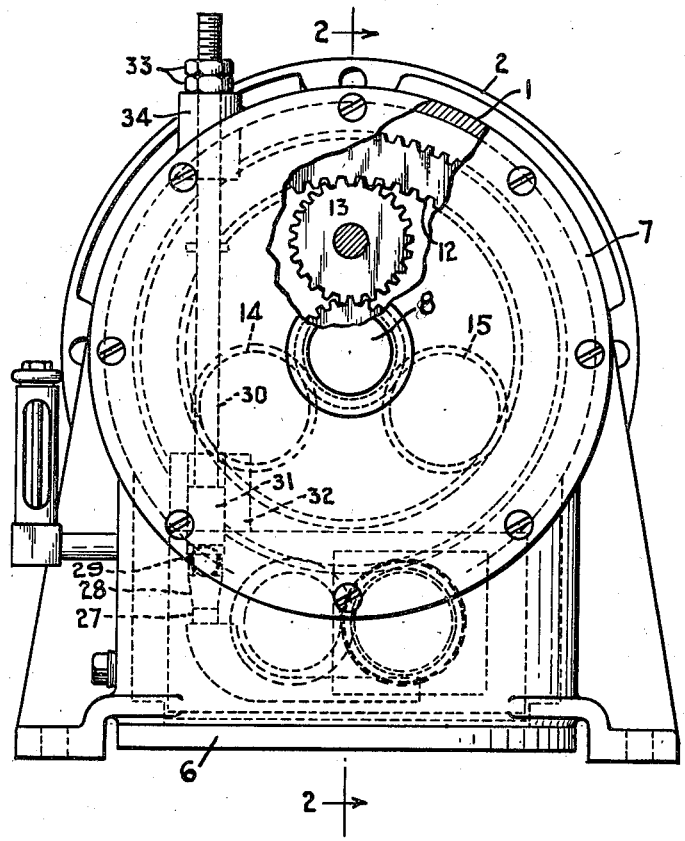
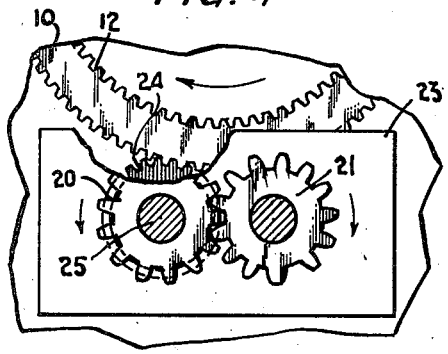
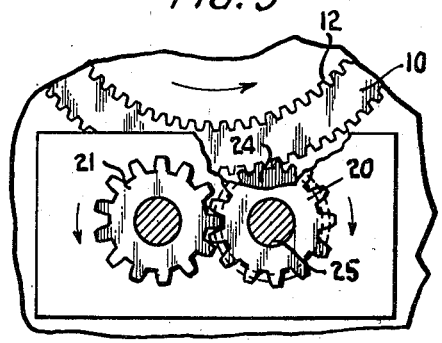
E. T. Ross INVENTOR.
BY Thomas Howe
ATTORNEY.

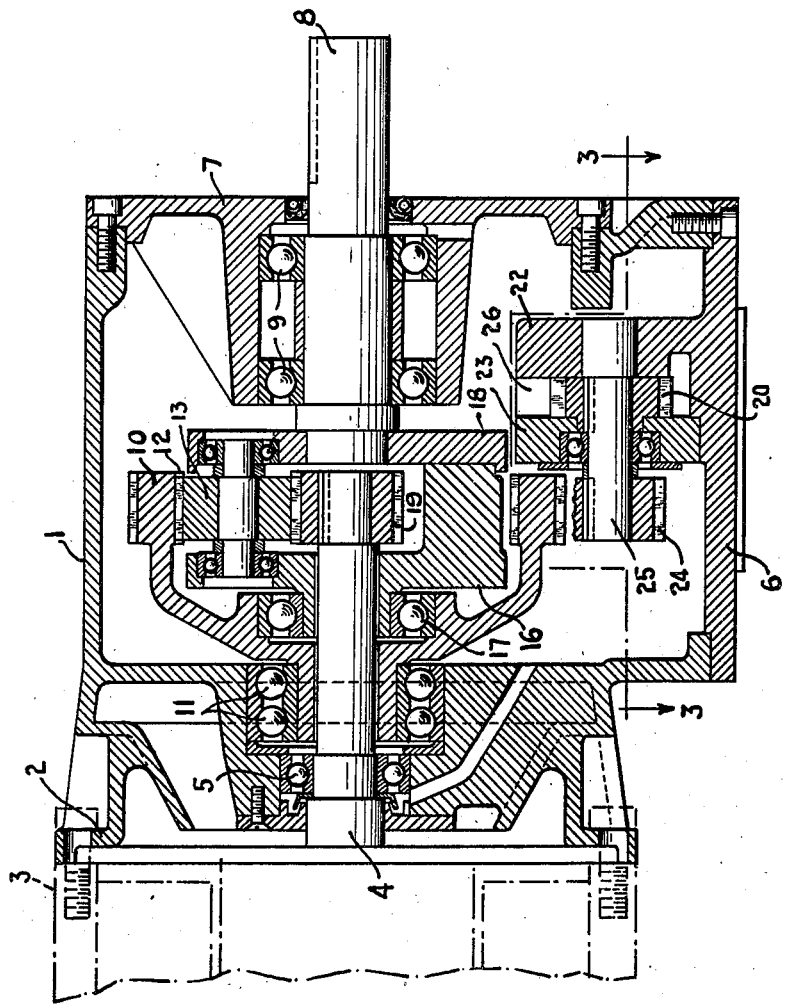

April 28, 1942.  E. T. ROSS  2,281,384
VARIABLE SPEED DRIVING MEANS
Filed Feb. 21, 1939  3 Sheets-Sheet 3

E. T. Ross  INVENTOR.
BY Thomas Howe
ATTORNEY.

Patented Apr. 28, 1942

2,281,384

UNITED STATES PATENT OFFICE 2,281,384

VARIABLE SPEED DRIVING MEANS

Edward T. Ross, Newark, N. J.

Application February 21, 1939, Serial No. 257,598

4 Claims. (Cl. 74—293)

This invention relates to means for driving a shaft at variable speeds.

It is well known to drive a shaft from a motor at variable speeds by interposing between the driven shaft and the motor a variable gear transmission.

It is an object of the present invention to so combine the motor and transmission structures that the whole may be more compact and the expense of labor and material used in the construction, lessened.

It is a further object of the invention to improve the type of variable speed transmission known as a "planetary" gear, no matter in what relation it may be used, by rendering it stronger and less liable to have its parts to become maladjusted and less liable to inadvertent changes in speed.

Other and ancillary objects of the invention will appear hereinafter.

In the accompanying drawings which illustrate the invention—

Fig. 1 is an end elevation, partly broken away, of apparatus embodying the invention;

Fig. 2 is a section, partly broken away, on the line 2—2 of Fig. 1;

Fig. 4 is a fragmentary view showing the relation of the ring of the planetary gearing to the pump driven thereby for one direction of rotation;

Fig. 5 is a view similar to Fig. 4 and showing the relationship of the pump and ring for the opposite direction of rotation.

Figure 3:
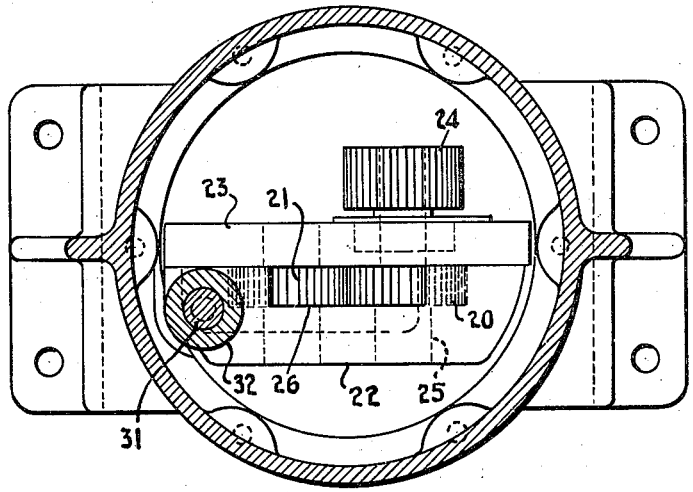
Fig. 3 is a section on the line 3—3 of Fig. 2.

Referring to the drawings and first to Figs. 1 to 5 inclusive, the apparatus comprises a casing for the variable speed transmission which includes the portion 1 integrally formed with the end head 2 suitably operated or otherwise secured to the frame or field ring 3 of an electric motor, the shaft 4 of the motor rotor being journaled in the end head by means of a ball bearing 5. The variable speed gear casing also is provided with a removable bottom plate 6 forming the bottom of the casing while the end of the transmission casing is closed by a removable plate 7 within which is journaled the shaft 8 by means of the ball bearings 9, which shaft is connected in driving relation with the motor shaft 4 by means of the variable speed transmission.

The variable speed transmission is of the planetary type comprising the outer ring 10 journaled in the end head wall of the casing by means of ball bearings 11 and having its internal gear teeth 12 meshing with the planetary gears 13, 14 and 15 each journaled on one side in the spider 16 which is rotatably mounted in the ring 10 by means of ball bearings 17. The other side of each of the gears 13, 14 and 15 is journaled in a plate 18 secured to the spider 16 and fixed to the shaft 8. The planetary gears 13, 14 and 15 also mesh with the central or sun gear 19 fixed upon the shaft 4. The ring 10 and spider 16 are rotatable about the shaft 4 but are out of contact therewith so that there is no tendency to inadvertent rotation of them by the shaft.

It will now be seen that the driven shaft 8 is adapted to be driven from the motor shaft 4 through the planetary gearing in a manner as is well understood in connection with such gearing. Also as is well understood the speed ratio of transmission is dependent upon the retarding effect exerted upon the external ring 10. To vary this retarding effect in an efficient, accurate and readily controllable manner, a gear pump is provided which is connected in driving relation with the ring 10, and which operates upon the lubricating fluid in the bottom of the transmission casing. Means is provided for controlling the fluid pumped so as to place a greater or less load upon the pump and so vary the speed ratio between the driving and driven shafts, which may be as set forth in my prior application Serial No. 204,257 filed April 26, 1938. Referring to the structure as shown in Figs. 1 to 5 inclusive hereof, the pump comprises the meshing pump gears 20 and 21 which are closely fitted between, and rotatably mounted in, the pump casing, comprising the rib 22 formed integrally with the bottom plate 6 of the transmission casing, and the plate 23 removably secured in position. The meshing pump gears are driven by means of a gear 24 meshing with the gear teeth upon the exterior of the ring 10, the gear 24 being fixed upon the shaft 25 of the gear 20. The top of the pump casing is open at 26 to provide an intake for the pump and the outlet of the pump is through a passage 27 controlled by a valve 28, the fluid being eventually discharged into the transmission casing through a passage 29.

The load placed upon the pump and hence the retarding effect upon the ring 10 whereby the speed is regulated, is controlled by opening the valve 28 more or less when the discharge from the pump is more or less restricted. To accomplish the regulation of the opening of the valve, the valve is mounted upon a stem 30 which carries an enlargement 31 which may be screw-threaded upon the interior of the boss 32 on the pump casing, so that as the stem 30 is turned in one direction or the other the valve 28 will be caused to approach more or less closely to its seat and the discharge of the pump thereby regulated to the desired degree.

It will be seen that the valve stem 30 extends to the exterior of the transmission casing where it may readily be turned and when the valve has been properly adjusted as evidenced by the attainment of the proper speed, the jam nuts 33 may be tightened against the boss 34 on the transmission casing when the valve will be locked in said position. Instead of having the stem enlargement 31 screw-threaded in the boss 32 on the pump casing, the enlargement 31 may have a smooth exterior adapted to slide upon a smooth interior of the boss 32. The position of the valve may then be regulated by sliding the stem in one direction or the other. The last mentioned construction is desirable in connection with regulation by automatic means secured to the outer end of the valve stem when such automatic means will hold the stem in position.

It will be seen that the gear lubricating fluid in the transmission casing is to be of a depth such that it will submerge the intake of the gear pump and then, the pump being operated as described, the fluid will be carried to the interior of the pump casing and beneath the pump gears whence it will be forced outwardly through the valve controlled discharge into the bath at the bottom of the transmission casing to be again circulated through the pump as described.

It is desirable that the pump gears 20 and 21 should rotate in a direction as shown by the arrows in Fig. 4 so that the fluid will be admitted at the top, carried downwardly into the pump casing and thence discharged. With the geared ring 10 rotating in the direction of the arrow of Fig. 4, the pump gears will be rotated in the direction as indicated by their arrows. If, however, the direction of rotation of the transmission should be reversed it will be seen that the pump gears would rotate in the opposite directions, so that the fluid pumped would tend to reverse its direction of circulation through the pump. To avoid this, the plate 23 and the pump gears rotatably mounted therein are so placed with relation to the gear ring 10 that the centers of rotation of the pump gears 20 and 21 are at equal radial distances from the center of the ring 10 so that when the plate 23 with the gears is turned end for end the pump driving gear 24 will still mesh with the external gear teeth on the ring 10. When, therefore, the direction of rotation of the transmission is reversed from that shown in Fig. 4, the plate 23 and its carried pump gears, can be turned end for end into the position as shown in Fig. 5 and, the direction of rotation of the ring 10 being reversed from that as shown in Fig. 4, the pump gears 20 and 21 will rotate as shown by the arrows in Fig. 5, so that the intermeshing portions of the gears 20 and 21 will still move upwardly and the outer portions move downwardly so that the circulation of fluid through the pump will continue to be in the same direction as produced by the arrangement of Fig. 4. The circulation of the pump may therefore be made to be in the same direction notwithstanding opposite directions of rotation of the transmission.

Figure 6:
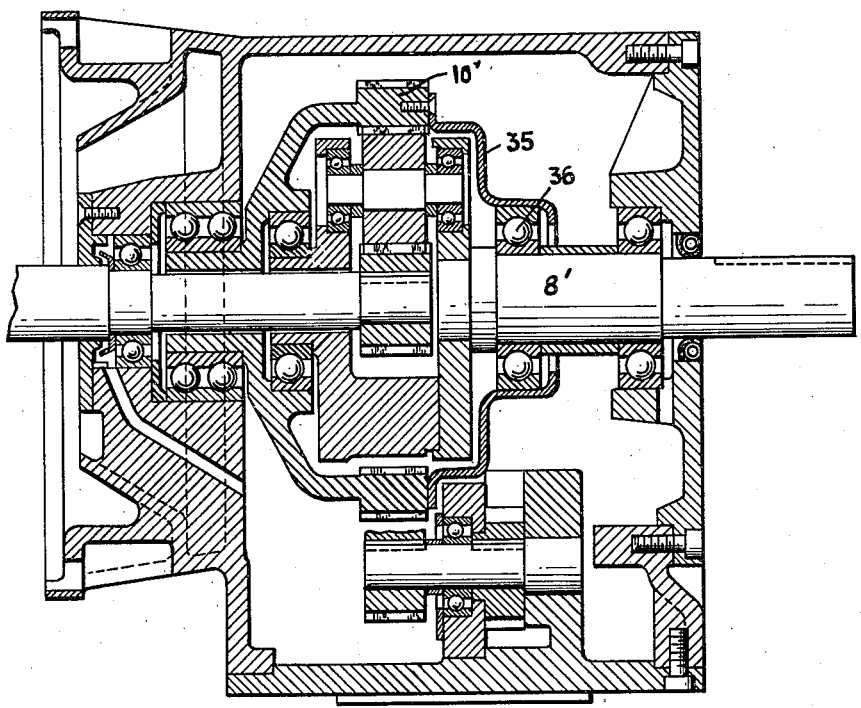
Fig. 6 is a view similar to Fig. 2 showing a modified form of planetary gearing.

Referring to the modified construction as shown in Fig. 6, that construction is the same as already described in connection with the preceding figures except that to the free side face of the exterior ring 10' of the planetary gearing there is secured a plate or head 35 which completely encircles the axis of the transmission and is rotatably mounted by means of ball-bearings 36 upon the driven shaft 8'. It will be seen that this strengthens the structure holding the driving and driven shafts in line and also supports the otherwise free side of the ring 10' so that it is securely held in position against distortions by the stresses to which the apparatus may be subjected in use, thus insuring that the gears will be at all times in proper adjusted relation which is essential to efficient operation. If the distortion which is prevented by the present construction, and mal-adjustment of the parts occasioned thereby, is carried to extremes it might even prevent the functioning of the apparatus. It is further to be observed that by applicant's improved construction, as referred to in connection with Fig. 5, the results as indicated are achieved without in any way hampering the free and proper operation or in any way impairing the functioning of the transmission.

While the invention has been illustrated in what are considered its best applications it may have other embodiments without departing from the structure and is not therefore limited to the structures shown in the drawings.

What I claim is:

1. In a variable speed planetary gearing, the combination with a gear casing, of a driving shaft journaled therein, a driven shaft journaled in said casing, a sun gear fixed to said driving shaft, a series of planetary gears rotating about the axis of said driving shaft and each planetary gear revolving about its own axis, said planetary gears meshing with said sun gear, an internally-toothed external ring encircling and meshing with said planetary gears, said ring being journaled in said casing to rotate about said driving shaft, said ring being clear of said driving shaft, a spider supporting said planetary gears, said spider being journaled in said ring to rotate about said driving shaft but to clear said driving shaft.

2. In a variable speed planetary gearing, the combination with a gear casing, of a driving shaft journaled therein, a driven shaft journaled in said casing, a sun gear fixed to said driving shaft, a series of planetary gears rotating about the axis of said driving shaft and each planetary gearing revolving about its own axis, said planetary gears meshing with said sun gear, an internally-toothed external ring encircling and meshing with said planetary gears, said ring being journaled in said casing to rotate about said driving shaft, a spider supporting said planetary gears, said spider being journaled in said ring to rotate about said driving shaft.

3. In a variable speed planetary gearing, the combination with a gear casing, of a driving shaft journaled in said casing, a driven shaft journaled in said casing, a sun gear fixed to said driving shaft, a series of planetary gears rotating about the axis of said driving shaft and each planetary gear revolving about its own axis, said planetary gears meshing with said sun gear, an internally-toothed external ring encircling and meshing with said planetary gears, said ring having a rotatably mounted supporting portion upon one side of said toothed portion and a rotatably mounted support for said ring upon the other side of said toothed portion.

4. In a variable speed planetary gearing, the combination with a gear casing, of a driving shaft journaled in said casing, a driven shaft journaled in said casing, a sun gear fixed to said driving shaft, a series of planetary gears rotating about the axis of said driving shaft and each planetary gear revolving about its own axis, said planetary gears meshing with said sun gear, an internally-toothed external ring encircling and meshing with said planetary gears, said ring having a rotatably mounted supporting portion upon one side of said toothed portion and a rotatably mounted support for said ring upon the other side of said toothed portion, the support upon one side of the toothed portion of said ring being journaled in said casing and the support at the other side of the toothed portion of said ring being journaled upon the driven shaft.

EDWARD T. ROSS.